INVENTORS
ROBERT F. McCOLLUM
GERALD W. WARD
BY
ATTORNEYS

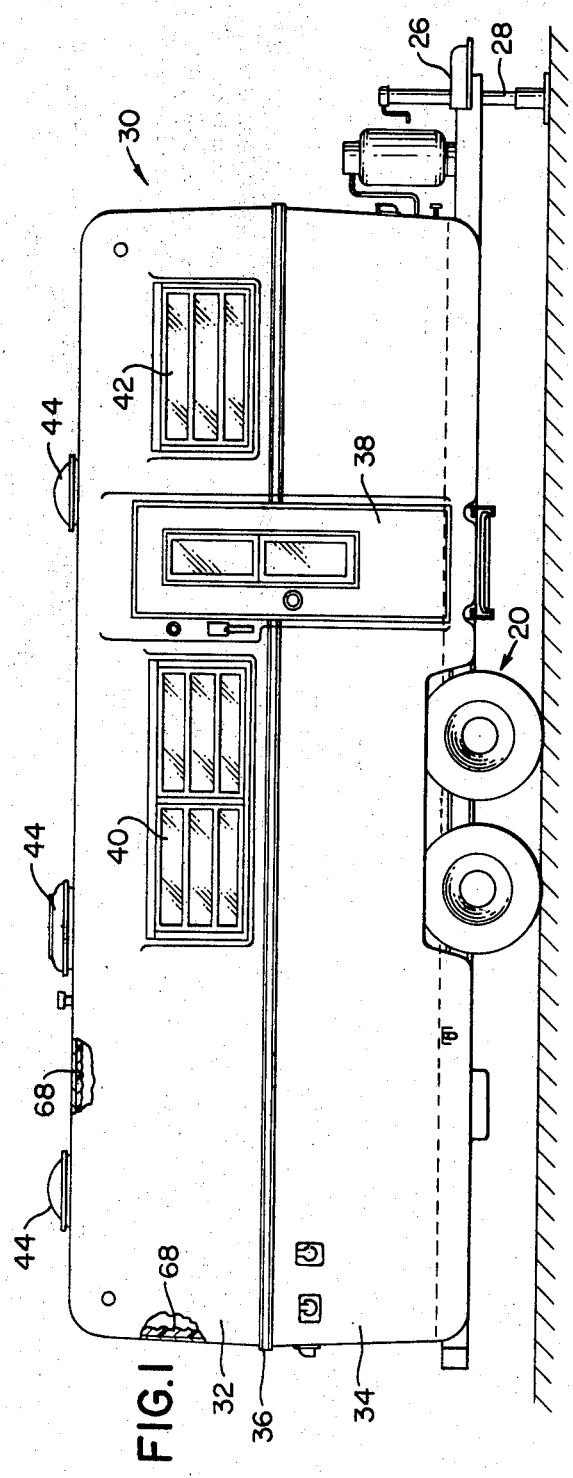
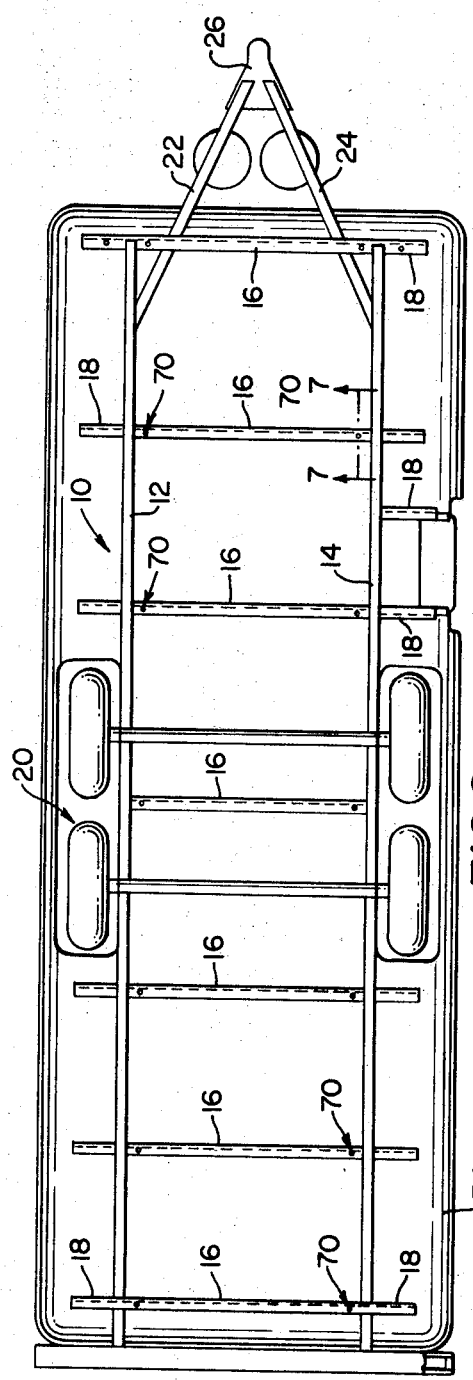

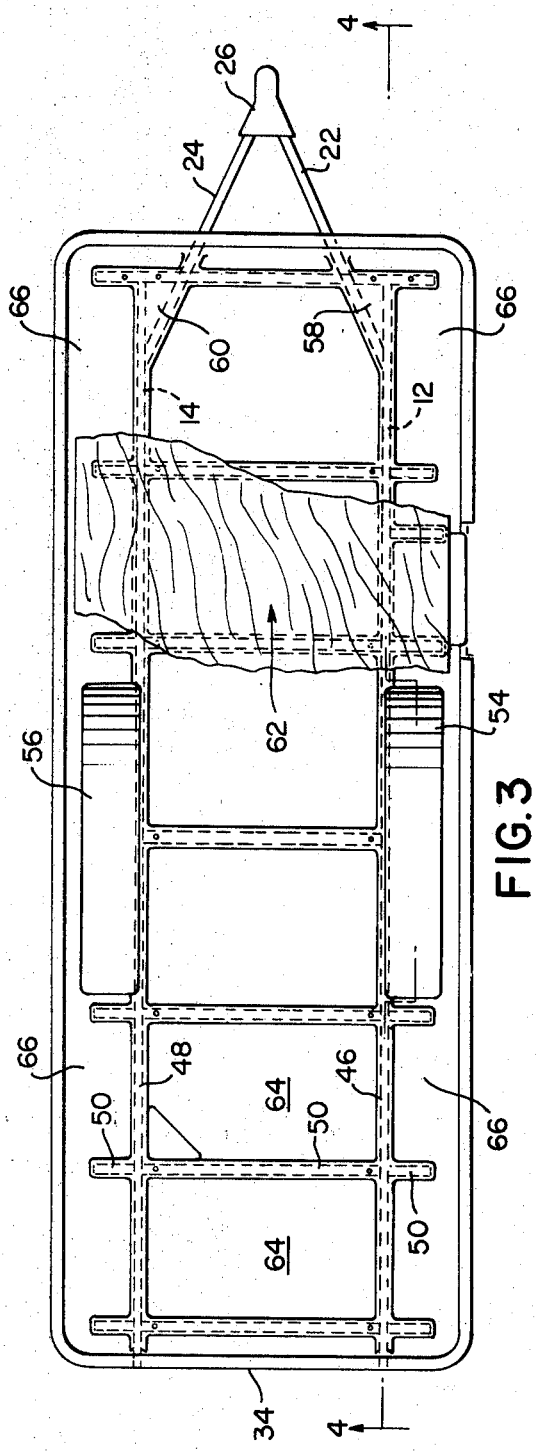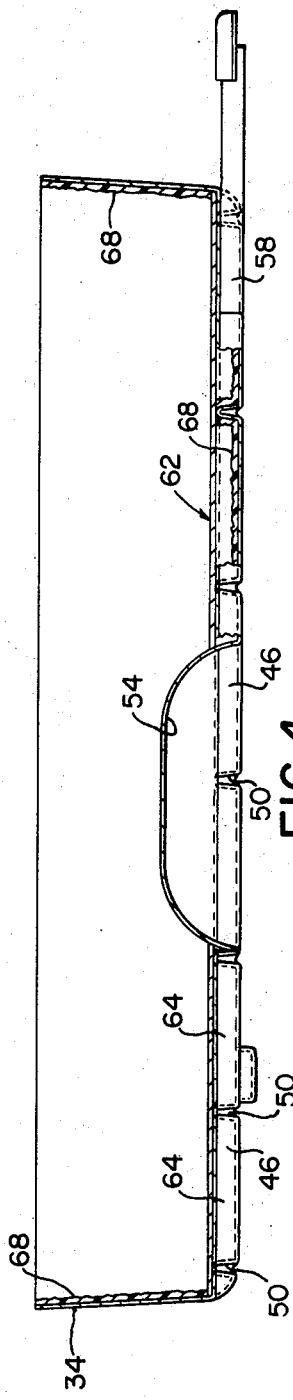

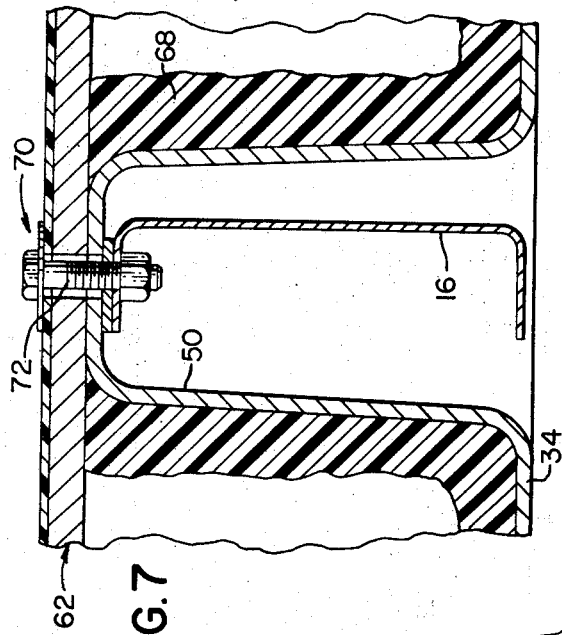
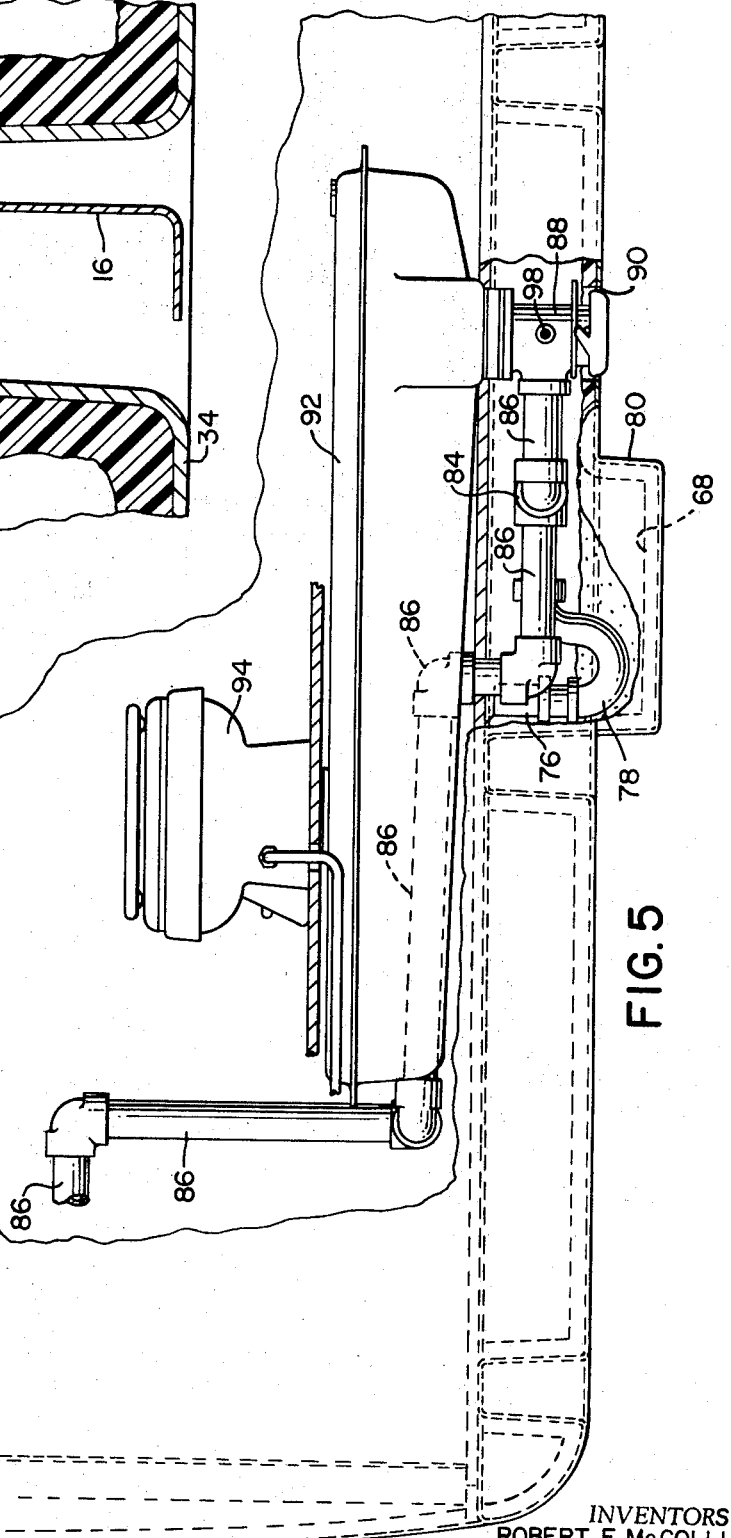

United States Patent Office 3,565,480
Patented Feb. 23, 1971

1

3,565,480
TRAILER CONSTRUCTION
Robert F. McCollum, Tulsa, and Gerald W. Ward, Bixby, Okla., assignors to Avco Corporation, Tulsa, Okla., a corporation of Delaware
Filed Dec. 2, 1968, Ser. No. 780,429
Int. Cl. B62d 27/00
U.S. Cl. 296—28                 11 Claims

ABSTRACT OF THE DISCLOSURE

The disclosure illustrates a molded fiberglass trailer body formed from complementary upper and lower shells joined at a band extending around the trailer. The lower shell has a series of transverse and longitudinal recesses in its bottom outer side which receive a ladder-type structural frame. The recesses are dimensioned so that the outer bottom surface of the trailer is flush. The resultant ridges formed on the interior of the bottom wall are used to support flooring. The flooring and ridges form a series of cavities having a substantial surface area relative to the ridges. These cavities are coated with a layer of urethane foam to provide a highly effective insulation for the flooring. Additionally, the inner side and top walls of the shells are coated with the foamed material to substantially insulate the entire interior of the trailer. One of the cavities formed underneath the floor is also used to house a drainage system for water utilization devices, such as sink, shower and privy, positioned in the trailer.

---

The present invention relates to trailer vehicles and more specifically to an improved structure for such a vehicle.

Over the years the field of mobile homes and camping vehicles has been expanded greatly. Many sizes are offered and there are a number of trailers having lengths which exceed 20 feet. Generally, the body shell for a trailer of this type is secured over the top of a rigid subframe that mounts a wheel and axle assembly. The interior floor of the trailer then rests on the bottom wall of the shell forming the body of the trailer.

This structure has a number of problems associated with its design. One of the problems is that the cross members of the frame extending beneath the trailer body have a high air resistance, thereby increasing the power required to tow the trailer at highway speeds. While some trailers have solved this problem by providing a thin metal pan around the bottom, the use of the pan complicates the trailer construction and adds to its cost. Another problem is that in the trailer of the above type, the floor must be positioned as close to the subframe as possible to have the floor at a convenient level for entrance and exit. Accordingly, if there is any insulation provided underneath the floor, it is a very thin layer, thereby making the trailer floor difficult to maintain at a comfortable level in an extreme temperature environment. One of the additional problems of this type of construction is that a certain degree of body twist can exist in the body shell since the shell is not very capable of resisting twisting moments.

Accordingly, it is an object of the present invention to provide a body for a trailer vehicle which is lightweight, extremely rigid and well insulated and convenient for use.

The above objects are provided by a body for a mobile vehicle such as a trailer which comprises a frame including longitudinally extending main structural members. A means is provided for forming an elongated molded relatively thin wall shell having longitudinally extending recesses formed in the outer bottom wall of the shell, the

2 recesses having a sufficient width and depth to generally conform to the width and depth of the main structural members. A means is provided for securing the body shell means to the main structural member so that the main structural members are received in the recesses to form a substantially flush bottom surface for said body shell means. As a result, the body shell means and the frame are substantially strengthened.

Preferably, the above mobile vehicle body includes a means on the inside of the body shell means for forming a floor which is supported by the side wall of the recesses, thereby forming a cavity between the flooring and the bottom wall of the body shell means adjacent recesses. This space is filled with foamed material so that the floor means is effectively insulated.

The above and other related objects and features of the present invention will be apparent from a reading of the description shown in the accompanying drawings and the novelty thereof pointed out in the appended claims.

In the drawings:

FIG. 1 is an elevational side view of a trailer embodying the present invention;

FIG. 2 is a plan view of the bottom side of the trailer shown in FIG. 1;

FIG. 3 is a plan view of a portion of the trailer shown in FIG. 1;

FIG. 4 is a view taken on lines 4—4 of FIG. 3;

FIG. 5 is an enlarged fragmentary view of the rear portion of the trailer shown in FIG. 1;

FIG. 7 is an enlarged view taken on lines 7—7 of FIG. 2, showing a detail of the method of attachment of the body shell to the frame members.

Figure 6:
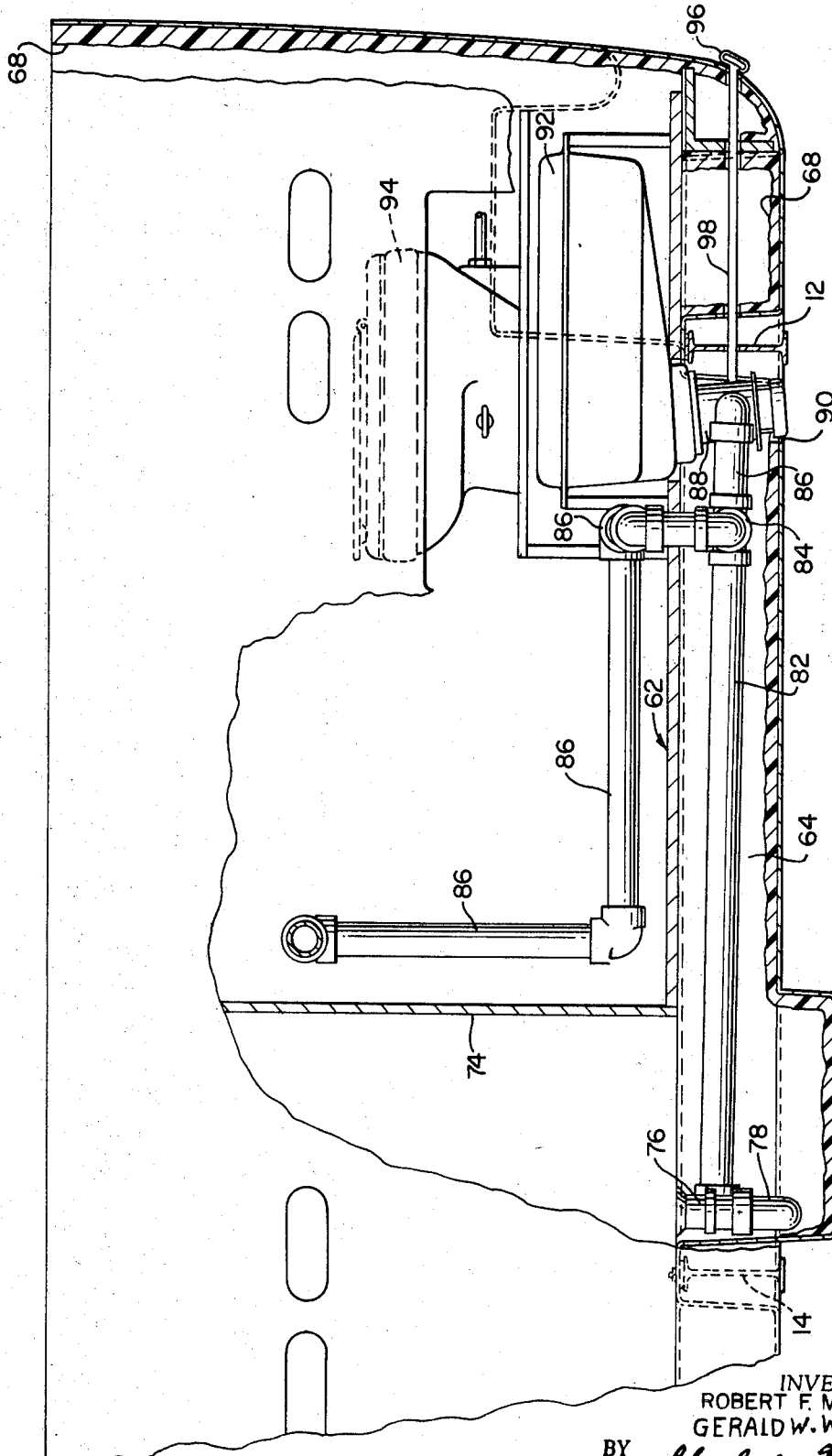
FIG. 6 is a view taken on lines 6—6 of FIG. 5.

Referring particularly to FIGS. 1 and 2, the trailer embodying the present invention comprises a frame 10 having a pair of spaced longitudinally extending main structural members 12, 14. The main structural members 12, 14 are secured to one another by a series of transverse frame members 16 to form a ladder-type frame. A series of transversely extending outrigger frame members 18 extends beyond the main frame members 12, 14 to support the outer sides of the trailer.

At approximately the midpoint of the frame 10 a tandem axle assembly 20 is secured to the frame members 12, 14. At the forward end of the frame 10 a pair of frame members 22, 24 extend forward in triangular fashion to a hitch assembly 26 for detachable mounting to a towing vehicle. As shown in FIG. 1, the hitch assembly 26 includes a jack 28 to support the forward end of the trailer in a horizontal position when the hitch is detached from a towing vehicle.

It is understood that the frame 10 may be constructed in many different ways by those skilled in the art, e.g., welding or bolting individual frame members together or forming the transverse members 16 and outrigger members from a single element notched to connect with the main frame members. Furthermore, the wheel and axle assembly 20 may be secured to the frame 10 in many different ways by those skilled in the art. Accordingly, the details of these assemblies will not be discussed.

A body, generally indicated by reference numeral 30, is mounted on the frame 10. The body comprises upper and lower complementary molded shells 32 and 34. These shells are preferably molded from an impregnated resinous material, such as fiberglass, using conventional molding techniques. The complementary shells 32, 34 are joined together along a band 36 which extends around a midplane of the trailer. The shells 32, 34 have an opening for a door 38 which permits entrance to the interior of the trailer. Openings are also provided for windows 40, 42 and for vents 44 on the top side of the shell 32. The interior of the trailer has typical items necessary for living purposes, e.g., dinette, kitchen, stove, privy, shower and wash basin facilities.

As shown in FIGS. 3 and 4, the lower shell 34 is comprised of relatively thin-walled molded fiberglass having a pair of longitudinally extending recesses 46 and 48 formed in the bottom outer side thereof. These recesses 46 and 48 are positioned in line with the main structural members 12, 14 and have a sufficient depth and width so that they receive the main structural members 12, 14 to form a substantially flush outer bottom wall for the shell 34. Additionally, transversely extending recesses 50 are formed in the bottom outer wall of the shell 32 in line with the transverse frame members 16 and 18. The recesses 50 are also formed with sufficient width and depth to completely receive the transverse frame member 16, 18 and form a flush outer bottom surface. Additional recesses 54, 56 are provided adjacent the outer sides of the recesses 46, 48, respectively, to provide wheel wells for the wheel and axle assembly 20. Additional recesses 58, 60 are provided for the forwardly extending draft members 22, 24.

It is noted that the frame-receiving recesses 46, 48, 50, 58 and 60, in the bottom outer side, form a series of ribs extending up from the inner bottom side of the shell 32. These ribs have a height approximately equal to the height of the members comprising the frame 10. A floor assembly 62 is then supported by the tops of the ribs formed by these recesses. The flooring assembly 62 typically comprises a subfloor of plywood or like material covered by a conventional floor covering. The flooring assembly and the ribs formed by the frame-receiving recesses form a series of cavities 64 along the center section of the trailer and cavities 66 along the sides of the trailer. These cavities are coated with an insulating layer of foamed material 68, such as polyurethane (shown particularly in FIG. 7), to form a highly effective insulation. The insulation may be used to completely fill the cavity or, preferably, provide a minimum layer to establish a low coefficient of heat transfer through the walls of the shell 32. It has been found that 1½ inches of foamed material for a cavity depth of 6 inches provides a maximum insulation for a minimum of material. However, other proportions may be used to achieve similar results. A layer of the same foamed material 68 is also applied to the side walls of the shell 34 and to the interior walls of the upper shell 32 (see FIG. 1).

The lower shell 34 is secured to the frame 10 at a plurality of locations 70 by means of a bolt assembly 72 which is secured to the flooring 62 and extends through the top wall of the recesses and to one of the frame members. FIG. 7 illustrates the bolt assembly 72 securing the flooring 62 and shell 34 to one of the cross frame members 16.

The cavities formed by the recesses may also be used to accommodate plumbing normally associated with water utilization devices found in a traveling type of trailer. As herein shown in FIGS. 5 and 6, the equipment comprises a shower stall 74 mounted on the flooring 62. The shower stall 74 has a drain 76 which connects to a trap 78. The required depth for the trap 78 necessitates that a slight protrusion 80 be formed in the bottom wall of the shell 34. The interior side of this protrusion is also coated with foamed material 68 for insulation. The trap 78 suitably connects with a cross pipe 82 that extends across the cavity 64 to a T-connection 84 interposed in pipes and fittings 86 extending to a sink or wash basin (not shown) supported above the flooring 62. The end pipe 86 connects to a discharge valve assembly 88 which is adapted to drain water from the sink, lavatory and shower through an opening 90 in the bottom wall of shell 34. The drain valve 88 is also connected to a holding tank 92 for a privy 94. Whenever it is necessary to drain the contents of the holding tank 92, a handle 96 outside the wall of shell 34 is pulled, thereby displacing rod 98 extending to valve assembly 88. This action opens valve 88 to drain tank 92 directly through opening 90. It is to be understood that a supply of water is provided in the usual fashion for each of the water utilization devices.

The above construction of the lower shell 34 provides a number of advantages. The most important advantage is that it enables a highly effective insulation for the flooring 62. It should be noted that while the heat transfer thickness along the ribs formed by the frame-receiving recesses is relatively small, it constitutes only a small percentage of the total heat transfer area for the bottom floor of the trailer. By far the greatest heat transfer area is found in the cavities 64, 66 formed between the ribs of the frame-receiving recess. This space is provided with a substantial thickness of insulation to minimize the heat transfer coefficient. Since the insulation is also on the side walls of the shell 34 and around the interior of the upper shell 32, the interior of the trailer is insulated to a significant extent. Thus it enables such an effective insulation that the major source of heat loss or heat intake is through the windows 40, 42. This provides a high degree of comfort for occupants of the trailer. Furthermore, while the trailer shown has a floor which is highly insulated, it is at the lowest possible level consistent with the top of the frame 10 so that entrance and exit to and from the trailer is greatly facilitated.

The cavities 64 conventiently enable their utilization for various components of the trailer. The assembly shown is the drainage portion of the plumbing system. It is noted that the drainage system which normally retains water at all times is also insulated from the exterior temperature environment. This substantially minimizes, if not eliminates, the tendency of drain pipes to freeze, as found in trailers having plumbing extending from the exterior floor of the trailer.

The trailer construction shown enables a substanially flush outer bottom surface for the trailer which greatly increases its aerodynamic efficiency and effectively minimizes the power required to tow the trailer at highway speeds. Additionally, since the bottom is flush, i.e., no protruding transverse frame elements, an object such as a rock or other object striking the bottom of the trailer will be deflected by a glancing impact thereby minimizing the possibility of structural damage.

The ribs formed in the inner bottom wall of shell 34 impart a high degree of structural rigidity to the trailer. Since the shell 34 is held against the frame 10 by the flooring 62, a uniformly distributed stress is transferred between the elements. As a result, very little, if any, twisting of the trailer body is experienced during normal operation.

Having thus described the invention, what is claimed as novel and desired to be secured by Letters Patent of the United States is:

1. A body for a mobile vehicle, said body comprising:
    a frame including longitudinally extending main structural members and at least one transversely extending structural member;
    means for forming an elongated, molded, relatively thin wall shell having longitudinally and at least one transversely extending recesses formed in the outer bottom wall of said shell, said recesses being in line with and having sufficient width and depth to generally conform to the width and depth of said main structural members and said transversely extending structural member;
    means for securing said body shell means to said main structural member so that said main structural members and said transversely extending structural member are received in said recesses to form a substantially flush bottom surface for said body shell means.

2. A mobile vehicle body as in claim 1 further comprising means on the inside of said body shell means for forming a floor, said floor being supported by the inside walls of said recesses, thereby to form a cavity between said flooring and the bottom wall of said body shell means between said recesses.

3. A mobile vehicle body as in claim 2 further comprising a layer of foamed material covering the bottom and side walls of said cavities whereby said floor is insulated.

4. A mobile vehicle body as in claim 2 wherein said securing means comprises a plurality of bolt means extending through said flooring, the inside wall of said recesses and said frame members thereby holding said members in compression.

5. A mobile vehicle body as in claim 1 wherein:
said frame further includes a plurality of transverse structural members extending between said longitudinal main structural members to form a ladder-type frame;
said body shell means has a plurality of transversely extending recesses formed in the outer bottom wall of said shell connecting said longitudinally extending recesses to conform to the ladder-type frame, said transverse recesses having sufficient width and depth to conform to the width and depth of the transverse structural members so that said members form a substantially flush bottom surface for said body shell means.

6. A mobile vehicle body as in claim 5 wherein:
said body shell means extends in a transverse direction beyond said longitudinal main structural members;
said frame comprises transverse outrigger structural members extending from said main structural members in line with said first-mentioned transverse members;
said body shell means includes a plurality of transverse recesses extending from said longitudinal recesses so that said recesses conform to said outrigger structural members, said recesses having a sufficient width and depth to generally conform to the width and depth of said outrigger structural members thereby to form a substantially flush bottom surface for said body shell means.

7. A mobile vehicle body as in claim 6 further comprising means on the inside of said body shell means for forming a floor, said floor being supported by the inside walls of said longitudinal and transverse recesses thereby to form a plurality of cavities between the flooring means and the bottom wall of said body shell means between the side walls of said recesses.

8. A mobile vehicle body as in claim 7 wherein:
the bottom shell-to-floor contact area of said transverse and longitudinal recesses is small relative to the total bottom area of said body shell means;
said body further comprises a layer of foamed insulating material on the bottom and side walls of said cavities;
whereby the floor assembly of said body shell means is effectively insulated.

9. A mobile vehicle body as in claim 8, further comprising:
wheel means mounted on said frame adjacent the outer sides of said spaced longitudinal main structural members;
said body shell means having upwardly extending recesses in the bottom side thereof generally conforming to said wheel means.

10. A mobile vehicle body as in claim 9, wherein said vehicle is equipped for living purposes including water utilization facilities and wherein said vehicle further comprises:
drain means extending beneath said flooring for interconnecting a number of utilization devices, said drain means being positioned within the bounds of a single cavity whereby said drain means is effectively insulated from the temperature environment exterior of said vehicle body.

11. A mobile vehicle body as in claim 10 wherein said body shell means comprises upper and lower body complementary shells mutually joined along a band extending around said shell.

References Cited

UNITED STATES PATENTS

| | | | |
|---|---|---|---|
| 2,637,592 | 5/1953 | Karlby | 296—28 |
| 2,876,037 | 3/1959 | Ingolia | 296—31(P) |
| 2,964,331 | 12/1960 | Sherman | 296—28.4 |
| 3,084,973 | 4/1963 | Beckley | 296—31(P) |
| 3,100,458 | 8/1963 | Baker et al. | 105—397 |
| 3,149,856 | 9/1964 | Schilberg | 296—28.4X |
| 3,481,643 | 12/1969 | Campbell | 296—28.2 |

FOREIGN PATENTS

| | | | |
|---|---|---|---|
| 910,251 | 12/1962 | Great Britain | 296—31(P) |

BENJAMIN HERSH, Primary Examiner

J. A. PEKAR, Assistant Examiner

U.S. Cl. X.R.

296—31; 52—309, 337